(12) United States Patent
L'Heureux et al.

(10) Patent No.: US 9,137,498 B1
(45) Date of Patent: Sep. 15, 2015

(54) DETECTION OF MOBILE COMPUTING DEVICE USE IN MOTOR VEHICLE

(76) Inventors: Israel L'Heureux, Monaco (MC); Mark D. Alleman, Portland, OR (US)

(*) Notice: Subject to any disclaimer, the term of this patent is extended or adjusted under 35 U.S.C. 154(b) by 279 days.

(21) Appl. No.: 13/210,535

(22) Filed: Aug. 16, 2011

(51) Int. Cl.
*H04N 7/18* (2006.01)

(52) U.S. Cl.
CPC ..................... *H04N 7/18* (2013.01)

(58) Field of Classification Search
CPC ........................................................ H04N 7/18
USPC .......................................................... 348/148
See application file for complete search history.

(56) References Cited

U.S. PATENT DOCUMENTS

| | | | |
|---|---|---|---|
| 6,914,541 B1 * | 7/2005 | Zierden | 340/937 |
| 6,973,333 B1 * | 12/2005 | O'Neil | 455/569.2 |
| 7,483,082 B2 * | 1/2009 | Chou | 348/645 |
| 7,920,146 B2 * | 4/2011 | Yamada | 345/594 |
| 8,305,666 B2 * | 11/2012 | Ramanath | 358/520 |
| 2004/0222904 A1 * | 11/2004 | Ciolli | 340/937 |
| 2004/0234126 A1 * | 11/2004 | Hampshire et al. | 382/162 |
| 2004/0252193 A1 * | 12/2004 | Higgins | 348/149 |
| 2006/0220905 A1 * | 10/2006 | Hovestadt | 340/901 |
| 2007/0282506 A1 * | 12/2007 | Breed et al. | 701/45 |
| 2008/0036623 A1 * | 2/2008 | Rosen | 340/936 |
| 2008/0170749 A1 * | 7/2008 | Albertson et al. | 382/103 |
| 2009/0102699 A1 * | 4/2009 | Behrens et al. | 342/109 |
| 2009/0168185 A1 * | 7/2009 | Augustine | 359/613 |
| 2010/0130182 A1 * | 5/2010 | Rosen | 455/414.1 |
| 2011/0105097 A1 * | 5/2011 | Tadayon et al. | 455/418 |
| 2011/0111724 A1 * | 5/2011 | Baptiste | 455/404.1 |
| 2011/0237219 A1 * | 9/2011 | Mendenhall et al. | 455/405 |
| 2012/0026331 A1 * | 2/2012 | Winner et al. | 348/148 |
| 2012/0039529 A1 * | 2/2012 | Rujan | 382/164 |
| 2012/0088462 A1 * | 4/2012 | Mader et al. | 455/161.1 |
| 2012/0214472 A1 * | 8/2012 | Tadayon et al. | 455/418 |
| 2012/0244840 A1 * | 9/2012 | Vander Veen et al. | 455/411 |
| 2013/0084847 A1 * | 4/2013 | Tibbitts et al. | 455/419 |
| 2013/0117078 A1 * | 5/2013 | Weik et al. | 705/13 |
| 2013/0150004 A1 * | 6/2013 | Rosen | 455/414.1 |
| 2013/0271605 A1 * | 10/2013 | Winner, Jr. | 348/148 |

\* cited by examiner

*Primary Examiner* — Richard Torrente
*Assistant Examiner* — Irfan Habib
(74) *Attorney, Agent, or Firm* — Michael J. Andri

(57) ABSTRACT

Embodiments for the detection of mobile device use in a motor vehicle are disclosed. As one example, a system and method are disclosed in which an image of a scene is captured via a camera. The presence of a graphical display of a mobile device is detected within the scene by processing the image to identify a signature pixel characteristic indicative of a graphical display in a portion of the scene corresponding to a driver's position within a vehicle frame of reference. An indication of a positive detection of the graphical display is output by the system.

14 Claims, 3 Drawing Sheets

DETECTION OF MOBILE COMPUTING DEVICE USE IN MOTOR VEHICLE

BACKGROUND

Local, state, and federal governments have instituted laws regarding the use of mobile computing devices such as cell phones, handheld computers, media players, etc. by drivers of motor vehicles. Such laws aim to increase motor vehicle safety, often by prohibiting use of mobile devices while operating a motor vehicle. Some uses mobile devices are apparent from outside of the motor vehicle, particularly if the driver has the mobile device raised to the driver's ear as typically performed during a voice call. Other uses, however, may be less apparent from outside of the motor vehicle, particularly if the driver discreetly uses the mobile device below the vehicle window, such as on the driver's lap. Discreet use of mobile devices by drivers may increase as the functionality of these devices expands beyond voice calls to include wireless Internet access, electronic games, media players, etc.

SUMMARY

Embodiments for the detection of mobile device use in a motor vehicle are disclosed. As one example, a system and method are disclosed in which an image is captured of a vehicle being operated on a public roadway. A location is determined of a driver's seat region of the vehicle within the image. The presence of an illuminated graphical display is detected in the driver's seat region of the vehicle in the image. The presence of the graphical display may be detected by processing the image to identify a signature pixel characteristic indicative of a graphical display in the driver's seat region of the vehicle in the image. The indication of a positive detection of the graphical display may be output. Claimed subject matter, however, is not limited by this summary as other implementations are disclosed by the following written description and associated drawings.

DETAILED DESCRIPTION

Figure 1:
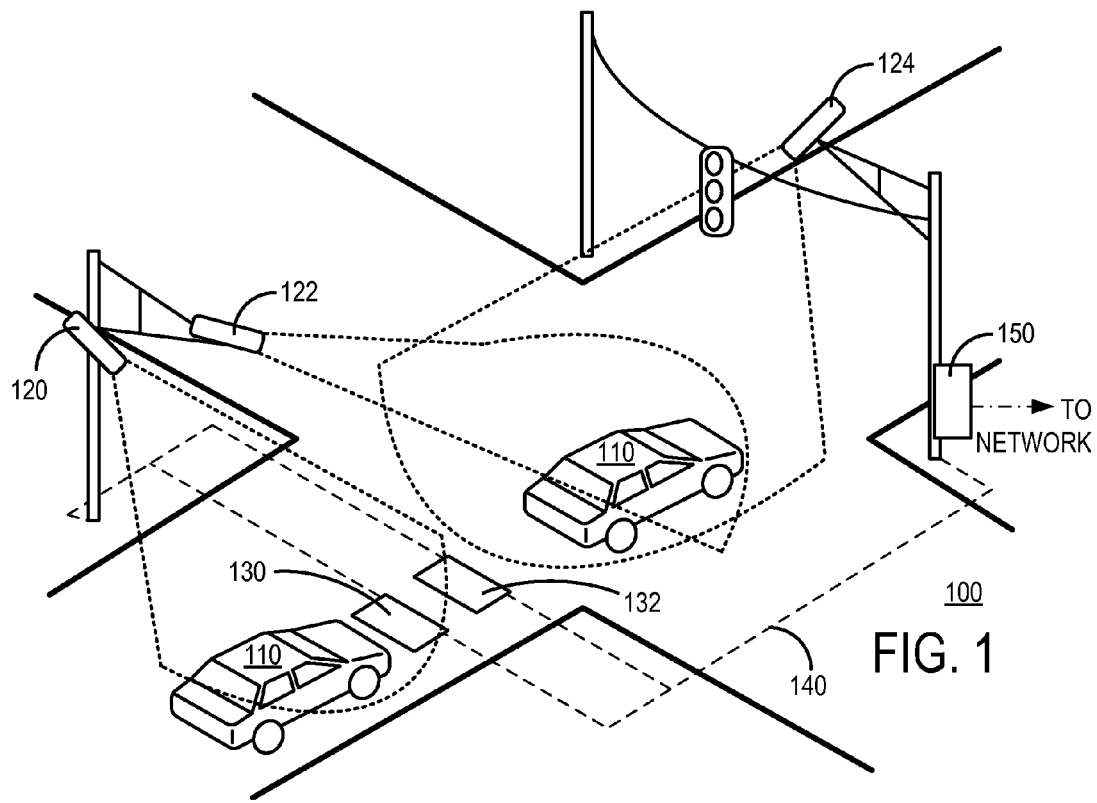
FIG. 1 is a schematic diagram depicting an example system for detection of a driver's mobile device use while operating a motor vehicle according to one embodiment.
Figure 2:
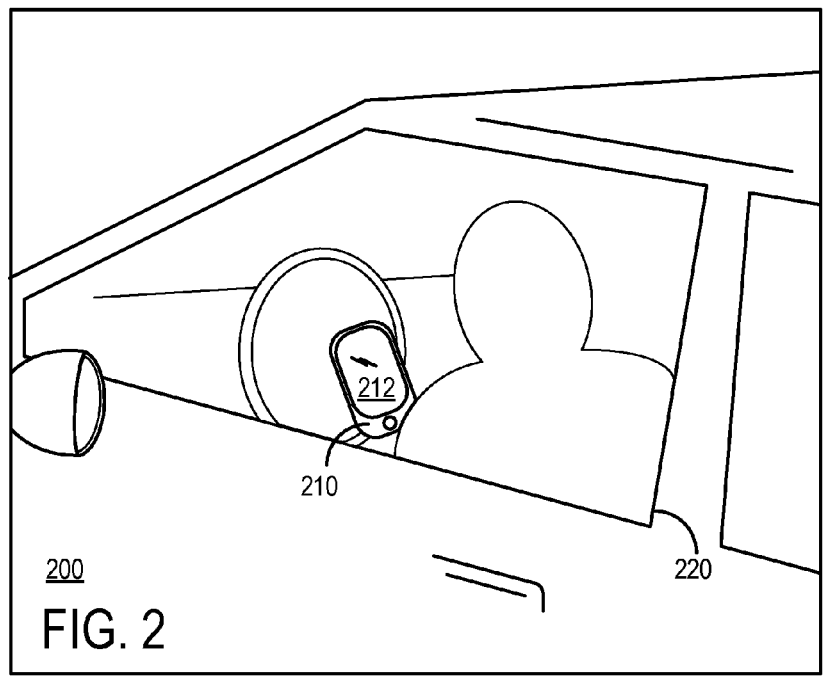
FIG. 2 is a schematic diagram depicting an example image captured of a mobile device detected within a motor vehicle.

FIG. 1 is a schematic diagram depicting an example system 100 for detection of a driver's mobile computing device (i.e., mobile device) use while operating a motor vehicle 110 according to one embodiment. System 100 may include one or more cameras such as camera 120 positioned to capture an image of a driver's side of motor vehicle 110 while the motor vehicle is being operated on a public roadway. FIG. 2 is a schematic diagram depicting a non-limiting example image 200 that may be captured by camera 120 of a mobile device 210 having a graphical display 212 detected within a motor vehicle.

System 100 may include a computing device 150 configured to receive an image from camera 120, and process the image to identify a graphical display of a mobile device being operated by the driver of the motor vehicle. As one example, computing device 150 may be configured to process the image captured by camera 120 by detecting a signature pixel characteristic selected from a group consisting of hue, value, chroma, brightness, and luminosity. Computing device 150 may be configured to process the image by identifying the signature pixel characteristic in each of a plurality of contiguous pixels covering at least a threshold area within the image. While computing device 150 is depicted in FIG. 1 nearby camera 120, in some implementations, computing device 150 may be located at a remote location from camera 120 and may communicate with camera 120 via a communication network.

FIG. 1 further depicts how system 100 may additionally include cameras 122 and 124. Cameras 122 and 124 may be configured to capture images from a different perspective than the images captured by camera 120. The different perspective of the cameras may enable a license plate of the vehicle to be visible in images captured by cameras 122 and/or 124 if not already visible in the images captured by camera 120.

System 100 may include one or more sensors such as sensors 130 and 132 configured to sense predetermined positions of motor vehicle 110. Sensors 130 and/or 132 may take the form of inductive loop sensors that sense the vehicle's presence at a particular location on the roadway. Alternatively or additionally, one or more sensors may take the form of optical sensors that detect the presence of the vehicle at a particular location. As one example, an optical sensor may be integrated with a camera system also including a camera, such as camera 120, 122, or 124. In some embodiments, the cameras 120, 122, and 124 may be additionally configured as depth cameras that are able to detect the distance of various objects from the camera, which distance information may be used by computing device 150 to determine that the vehicle is at the particular location.

Computing device 150 or a separate controller (discussed in greater detail with reference to FIG. 4) may be configured to receive a signal from sensor 130 and/or sensor 132 indicating that the motor vehicle is in a predetermined position, and in response to the signal, send a signal to a select one or more of cameras 120, 122, 124 to cause the camera or cameras to capture an image of the vehicle. Computing device 150 or alternatively the separate controller may be configured to associate meta data with the image including, for example, location and time. Computing device 150 or alternatively the separate controller may be configured to send image data including images captured by one or more of cameras 120, 122, 124 to a remote computing device via a communications network, for example, to be presented to a government agent.

Figure 3:
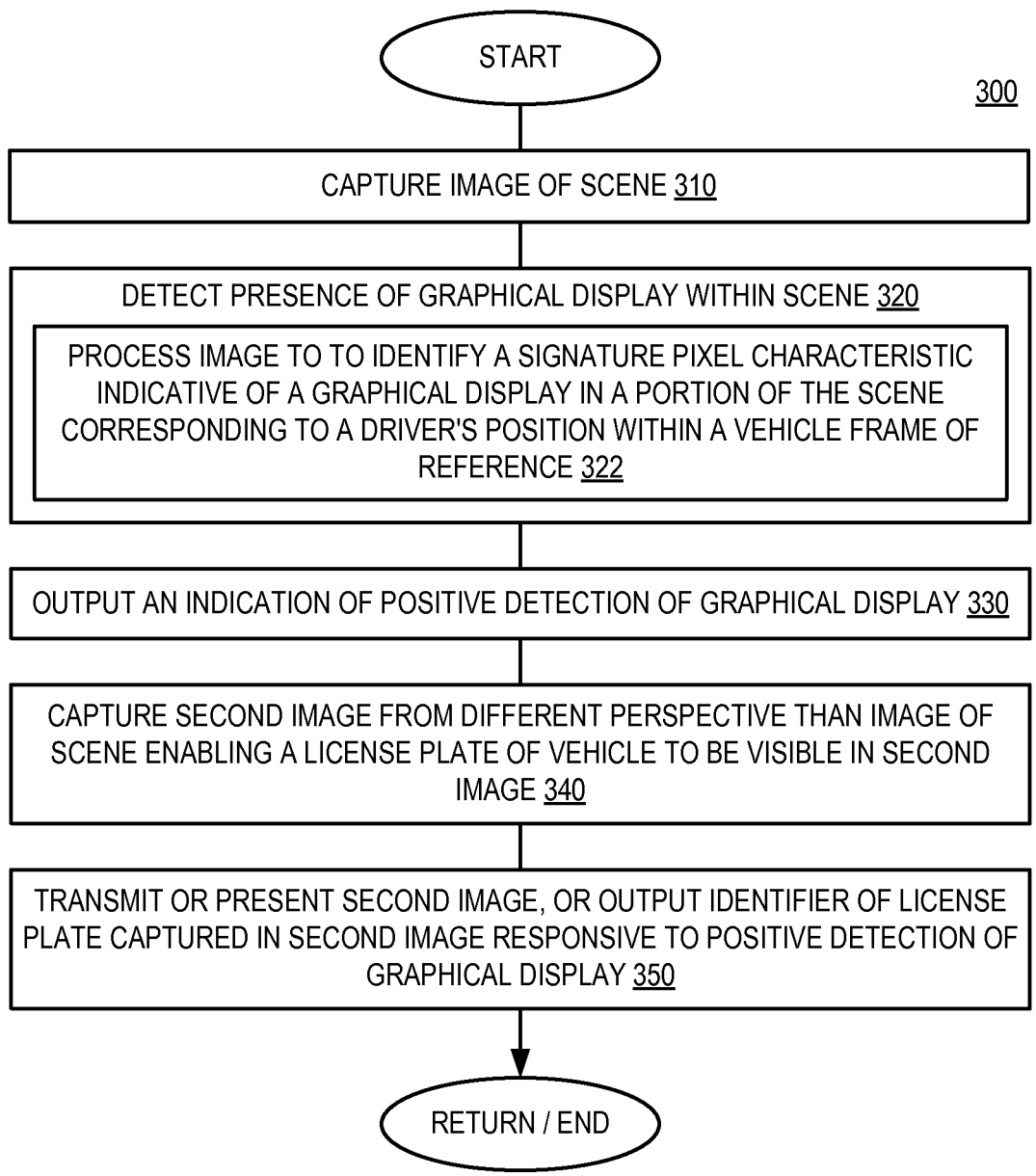
FIG. 3 is a flow diagram depicting an example method for detecting the presence of a graphical display of a mobile device within a vehicle.

FIG. 3 is a flow diagram depicting an example method 300 for detecting the presence of a graphical display of a mobile device within a vehicle. As one example, method 300 may be performed by previously described computing device 150 of FIG. 1. Accordingly, method 300 may be implemented as instructions executable by a processor of a computing device, or by processors of multiple coordinated computing devices.

At 310, the method may include capturing an image of a scene. The image of the scene may be captured responsive to satisfaction of a trigger condition. The trigger condition may indicate the presence of the vehicle within the scene. For example, the trigger condition may be satisfied by a signal received at a computing device or controller from one or more sensors. As previously discussed, a sensor may include an inductive loop sensor, an optical sensor, or other suitable sensor. However, as an alternative to utilizing a trigger condition, the image of the scene may be one of a plurality of images of a video obtained from one or more video cameras that monitor the scene.

At 320, the method may include detecting the presence of a graphical display (e.g., of a mobile device) within the scene. For example, at 322, the method may include processing the image to identify a signature pixel characteristic that includes one or more of a hue, value, chroma, brightness, and/or luminosity. Processing the image may include applying edge detection and/or shape recognition algorithms to the image to identify characteristic shape of the graphical display and/or applying a filter to the image to identify the signature pixel characteristic. For example, a positive detection of the graphical display may be identified if one or more of a target hue, chroma, brightness, and/or luminosity values or particular combinations thereof are present within the image.

The edge detection algorithm may, for example, determine that a signature pixel characteristic such as high luminosity or a characteristic hue within a predefined range exists in the driver's seat region of the image. The high luminosity or pixels of characteristic hue are then compared to surrounding pixels in adjacent regions of the image, to determine whether the brighter/characteristically colored pixels differ from pixels in adjacent portions of the image by greater than a predetermined luminosity or hue difference threshold. If so, then the edge detection algorithm may also determine whether the high luminosity or characteristic hue pixels only appear within a border that has an aspect ratio that is within a predetermined range of target aspect ratios. This predetermined range of target aspect ratios may be, for example, within 10% of 4:3, for example.

In some implementations, the image may be further processed by identifying a target region of the image at which the driver's side window of the motor vehicle is located. The target region may be identified by extracting features of the motor vehicle including detected wheels and/or outline of the vehicle, and locating the estimated position of the driver's side window based on the extracted features. For example, edge detection, shape recognition, and/or other suitable image processing techniques may be applied to the image to identify elements of a motor vehicle and/or the graphical display located within the motor vehicle. As a non-limiting example, the graphical display may be identified by searching for an illuminated trapezoidal shape within the image relative to a darker geometric region representative of a window of the vehicle. Further processing of the image may be performed to identify whether one or more of the driver's fingers are partially obstructing the graphical display, which may be further indicative of active use of the graphical display by the driver.

At 330, the method may include outputting an indication of a positive detection of the graphical display. The indication may be output by presenting the image of the scene via a graphical display or transmitting the image to a remote computing device for inspection by personnel. Outputting the indication may include mailing the image of the scene to a mailing address associated with the vehicle along with a government issued citation. In some implementations, the method at 322 and/or 330 may further include detecting the driver's position within the vehicle frame of reference by processing the image to identify a window of the vehicle, and outputting the indication of the positive detection only if the graphical display is present within an interior region of the window corresponding to the driver's position within the vehicle frame of reference.

At 340, the method may include capturing a second image from a different perspective than the image of the scene. The different perspective may enable a license plate of the vehicle to be visible in the second image. For example, a first camera may be used to capture an image of the driver's side of the motor vehicle, and a second camera may be used to capture an image of the motor vehicle from a front or rear side of the motor vehicle. These images may be captured at the same time or at different times relative to each other. A sensor output indicating another triggering condition may be used to initiate capture of the second image for identifying a license plate of the vehicle.

At 350, the method may include presenting the second image or outputting an identifier of the license plate captured in the second image responsive to positive detection of the graphical display. For example, image data including the second image may be transmitted to a remote computing device for presentation to personnel.

Figure 4:
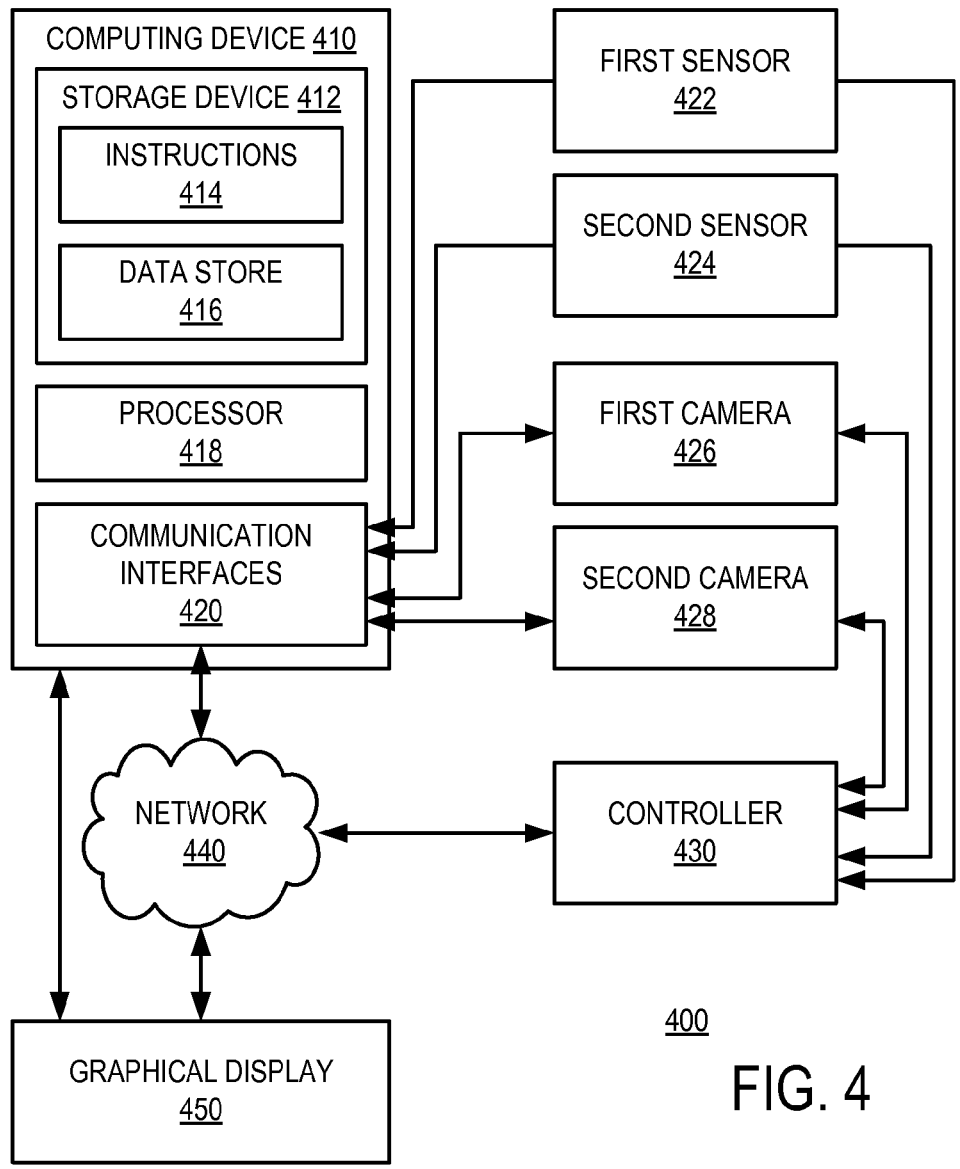
FIG. 4 is a schematic diagram depicting an example system including further aspects of the example system of FIG. 1.

FIG. 4 is a schematic diagram depicting an example system 400 including further aspects of the example system 100 of FIG. 1. Hence system 400 may depict a non-limiting example of system 100. System 400 includes computing device 410, which may correspond to previously described computing device 150.

Computing device 410 includes a storage device 412 having instructions 414 and data store 416 stored thereon. Computing device 410 includes a processor 418. Instructions 414 may be executable by processor 418 to perform one or more of the methods, processes, and operations described herein. Instructions 414 may take the form of software, firmware, and/or suitable electronic circuitry. Computing device 410 may include a communication interface 420 to facilitate wired and/or wireless communications with other components of system 400.

System 400 includes a first camera 422 and a second camera 424. System 400 includes a first sensor 426 for triggering first camera 422, and a second sensor 428 for trigger second camera 424. Sensors 426 and 428 may take the form of induction loop sensors, optical sensors, etc. Cameras 422 and 424, and sensors 426 and 428 may be remotely located from computing device 410 in some implementations. For example, system 400 may include a controller 430 located nearby cameras 422 and 424, and sensors 426 and 428 that is physically separate from computing device 410. Controller 430 may receive signals from sensors 426 and 428, send signals to cameras 422 and 424 in response thereto, and receive respective images from cameras 422 and 424. Controller 430 may itself take the form of a computing device.

In some implementations, controller 430 may transmit images captured by cameras 422 and 424 to computing device 410 via communication network 440 for processing of the images at computing device 410. Hence, in some implementations, capture of images may be managed by controller 430 while image processing is performed by computing device 410. In other implementations, such as depicted in FIG. 1, computing device 410 may manage the capture of images and perform image processing, and controller 430 may be omitted.

Computing device 410 may output image data including the captured images (e.g., in raw and/or processed states) to a graphical display 450. The graphical display may be located at or form part of a remote computing device from computing device 410, in which case computing device 410 may transmit image data to graphical display 450 via communication network 440. For example, graphical display 450 may be located at government offices remote from the public roadway monitored by the cameras. Alternatively, graphical display 450 may be located at or form part of computing device 410 in some implementations. For example, controller 430 may be located at or nearby the cameras and/or sensors, and computing device 410 may be located at government offices remote from the public roadway.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method performed by a computing device for detecting presence of an illuminated graphical display of a mobile device within a motor vehicle, the method comprising:
   capturing, by a camera, an image of the vehicle being operated on a public roadway responsive to satisfaction of a trigger condition indicating presence of the vehicle;
   receiving the image of the vehicle being operated on a public roadway captured by the camera;
   determining a location of a driver's seat region of the vehicle corresponding to a darker geometric region within the image that is representative of a window of the vehicle;
   searching within window of the vehicle within the image for pixels of a signature pixel characteristic having a high luminosity relative to other pixels of the darker geometric region and/or a characteristic hue within a predefined range;
   identifying an area of contiguous pixels of the signature pixel characteristic within the image indicative of the illuminated graphical display of the mobile device;
   determining whether the area of contiguous pixels appears within a border of a trapezoidal shape having an aspect ratio that is within a predetermined range of a target 4:3 aspect ratio; and
   outputting an indication of a positive detection of the illuminated graphical display of the mobile device within the image if the aspect ratio of the border of the trapezoidal shape is within the predetermined range of the target 4:3 aspect ratio.

2. The method of claim 1, wherein the signature pixel characteristic further includes one or more of a chroma and/or a brightness within respective predefined ranges.

3. The method of claim 1, wherein outputting the indication includes presenting the image via a graphical display for inspection by personnel.

4. The method of claim 1, wherein outputting the indication includes transmitting image data including the image to a remote computing device via a communication network.

5. The method of claim 1, wherein outputting the indication includes mailing the image to a mailing address associated with the vehicle along with a government issued citation.

6. The method of claim 1, wherein the image is a first image, the method further comprising:
   capturing a second image from a different perspective than the first image, the different perspective enabling a license plate of the vehicle to be visible in the second image; and
   presenting the second image or outputting an identifier of the license plate captured in the second image responsive to positive detection of the illuminated graphical display.

7. The method of claim 1, further comprising:
   applying a filter to the image to identify the signature pixel characteristic.

8. The method of claim 1, further comprising:
   further processing the image to identify a finger of the driver obstructing a portion of the trapezoidal shape corresponding to the illuminated graphical display.

9. A system for detection of a driver's mobile device use while operating a motor vehicle, comprising:
   a camera positioned to capture an image of a driver's side of the motor vehicle while the vehicle is being operated on a public roadway; and
   a computing device being configured to:
      capture, by the camera, the image of the vehicle being operated on the public roadway responsive to satisfaction of a trigger condition indicating presence of the vehicle;
      receive the image of the vehicle captured by the camera;
      determine a location of a driver's seat region of the vehicle corresponding to a darker geometric region within the image that is representative of a window of the vehicle;
      search within window of the vehicle within the image for pixels of a signature pixel characteristic having a high luminosity relative to other pixels of the darker geometric region and/or a characteristic hue within a predefined range;
      identify an area of contiguous pixels of the signature pixel characteristic within the image indicative of an illuminated graphical display of the mobile device;
      determine whether the area of contiguous pixels appears within a border of a trapezoidal shape having an aspect ratio that is within a predetermined range of a target 4:3 aspect ratio; and
      output an indication of a positive detection of the illuminated graphical display of the mobile device within the image if the aspect ratio of the border of the trapezoidal shape is within the predetermined range of the target 4:3 aspect ratio.

10. The system of claim 9, wherein the signature pixel characteristic further includes one or more of a chroma and/or a brightness within respective predefined ranges.

11. The system of claim 9, wherein the computing device is configured to identify the window as a driver's side window by extracting features of the vehicle including detected wheels and/or outline of the vehicle, and locating the estimated position of the driver's side window based on the extracted features.

12. The system of claim 9, wherein the computing device is further configured to process the image by identifying the signature pixel characteristic in each of a plurality of contiguous pixels of the subject pixel region covering at least a threshold area within the image.

13. The system of claim 9, further comprising:
   a sensor configured to sense a predetermined position of the motor vehicle;
   a controller being configured to receive a signal from the sensor indicating the motor vehicle is in the predetermined position, and in response to send a signal to the camera to cause the camera to capture the image.

14. The system of claim 13, wherein the controller is configured to associate meta data with the image including location and time.

* * * * *